(12) United States Patent  (10) Patent No.: US 8,893,973 B2
Shaffer et al.  (45) Date of Patent: Nov. 25, 2014

(54) CODED ARTICLES AND SYSTEMS AND METHODS OF IDENTIFICATION OF THE SAME

(71) Applicants: Wayne Shaffer, Penfield, NY (US); Hideo Kido, Trabuco Canyon, CA (US)

(72) Inventors: Wayne Shaffer, Penfield, NY (US); Hideo Kido, Trabuco Canyon, CA (US)

(*) Notice: Subject to any disclaimer, the term of this patent is extended or adjusted under 35 U.S.C. 154(b) by 0 days.

(21) Appl. No.: 13/857,887

(22) Filed: Apr. 5, 2013

(65) Prior Publication Data

US 2013/0264389 A1 Oct. 10, 2013

Related U.S. Application Data

(60) Provisional application No. 61/621,174, filed on Apr. 6, 2012.

(51) Int. Cl.
| | |
|---|---|
| *G06K 7/10* | (2006.01) |
| *G06K 7/14* | (2006.01) |
| *G06K 19/00* | (2006.01) |
| *G06K 19/06* | (2006.01) |
| *G07D 7/00* | (2006.01) |
| *G07D 7/20* | (2006.01) |
| *G06K 7/015* | (2006.01) |
| *G07D 7/12* | (2006.01) |

(52) U.S. Cl.
CPC ............ *G06K 7/1447* (2013.01); *G07D 7/0046* (2013.01); *G07D 7/2033* (2013.01); *G06K 7/015* (2013.01); *G07D 7/121* (2013.01); *G06K 19/06178* (2013.01); *G07D 7/00* (2013.01)
USPC ............ 235/458; 235/435; 235/439; 235/454; 235/462.2; 235/487; 235/489; 235/494

(58) Field of Classification Search
CPC ............ B65B 61/02; B41M 5/24; G06K 7/14
USPC ......... 235/489, 487, 494, 458, 454, 439, 435, 235/462.2, 462.01
See application file for complete search history.

(56) References Cited

U.S. PATENT DOCUMENTS

| | | | |
|---|---|---|---|
| 5,019,699 A * | 5/1991 | Koenck .................... | 235/472.01 |
| 5,376,771 A | 12/1994 | Roy | |
| 6,776,341 B1 | 8/2004 | Sullivan et al. | |
| 8,102,520 B2 | 1/2012 | Ackley, Jr. et al. | |
| 2006/0006236 A1* | 1/2006 | Von Fellenberg et al. .... | 235/458 |
| 2007/0091332 A1* | 4/2007 | Nunnink ........................ | 358/1.6 |
| 2008/0043220 A1* | 2/2008 | Kaplan et al. ................... | 356/30 |
| 2009/0302595 A1* | 12/2009 | Rubio Sanz et al. ............ | 283/82 |
| 2010/0108874 A1* | 5/2010 | Zahedi ........................... | 250/271 |
| 2010/0208313 A1* | 8/2010 | Horgan et al. ................... | 359/2 |
| 2010/0314861 A1* | 12/2010 | Amidror et al. ................ | 283/85 |
| 2011/0283369 A1* | 11/2011 | Green ............................. | 726/30 |
| 2012/0306189 A1* | 12/2012 | Stewart et al. .................. | 283/67 |

FOREIGN PATENT DOCUMENTS

GB 2477951 A * 8/2011

* cited by examiner

*Primary Examiner* — Thien M Le
*Assistant Examiner* — Claude J Brown
(74) *Attorney, Agent, or Firm* — Anthony J. Bourget

(57) ABSTRACT

A laser scanning system with sufficient power to drill very small holes or marks in materials. The holes or marks are so small that they cannot be seen with the human eye. These holes and marks can be arranged in an ID matrix barcode or other barcode that can be detected with a specially designed barcode reader.

16 Claims, 14 Drawing Sheets

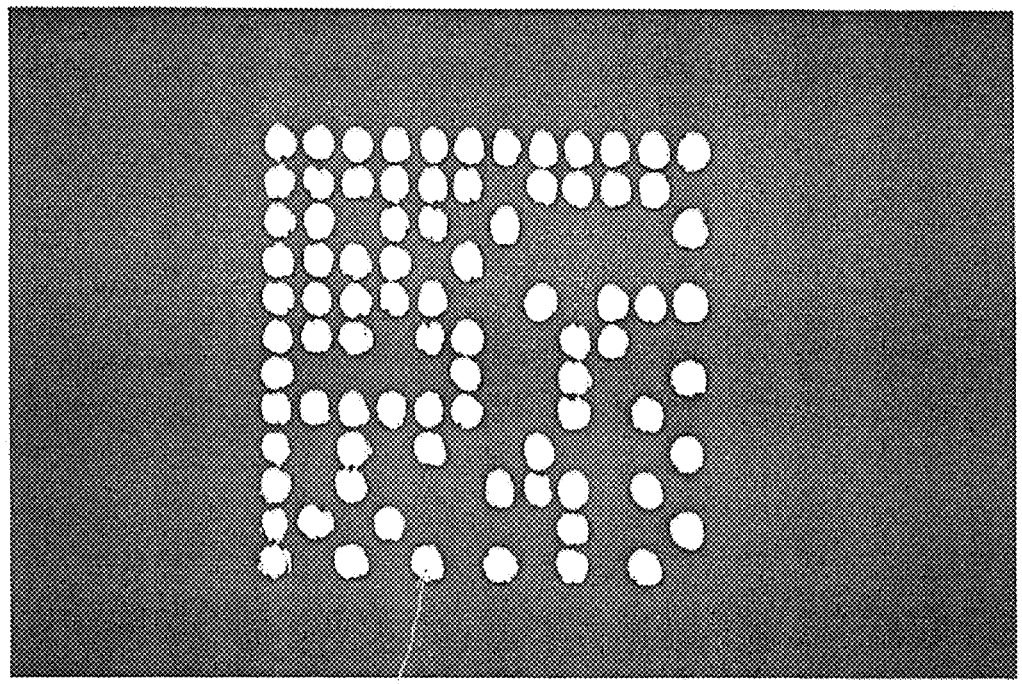
34a  FIG. 16
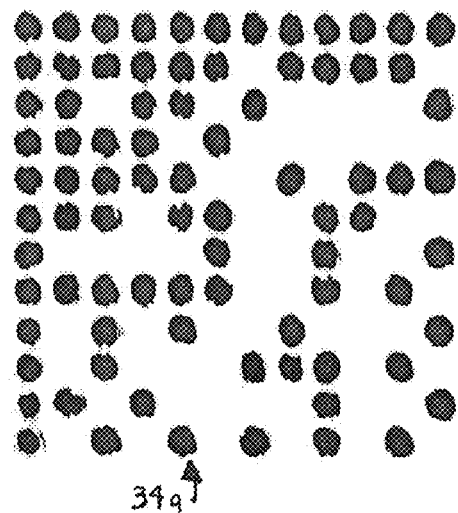
34a  FIG. 17

CODED ARTICLES AND SYSTEMS AND METHODS OF IDENTIFICATION OF THE SAME

RELATED APPLICATIONS

This application claims the benefit and priority of Provisional Patent Application Ser. No. 61/621,174, filed on Apr. 6, 2012, for a Laser & galvanometer scanner to produce a "Micro Barcode" and a reader to decipher the micro-barcode for Anti-counterfeiting purposes, under 35 U.S.C. 119(e), incorporated herein by reference.

BACKGROUND OF THE INVENTION

1. Field of the Invention

This invention relates to articles bearing small-sized code markings or apertures in the form of machine-readable barcode images and related systems and methods.

2. Background Information

Barcodes have been used for anti-counterfeiting through data checking and computer based authenticity correlation. Barcodes have also been used in pill identification and identification of other articles. Reference has been made to use of lasers in conjunction with barcode technology. Some examples of articles or systems that utilize laser and/or barcode technology include those disclosed in patents such as U.S. Pat. No. 8,102,520, U.S. Pat. No. 6,776,341, and U.S. Pat. No. 5,376,771.

While the foregoing products and methods are beneficial, there is always room for improvement.

SUMMARY OF THE INVENTION

The present inventors have developed a system of identification of articles which utilize very small codes. The codes may be in the form or orientation of barcodes of a variety of configurations used by standard commercial barcode reading or barcode scanning systems. While barcodes have been used to identify articles in the past, and in some cases small scale codes have been used, the ultra small scale size of the codes in the instant case present an improvement over prior systems. The small scale size of the code which is created by utilizing a laser to mark the surface of an article is so small that the individual markings cannot be discerned by the naked eye. In some examples the code which is comprised of a plurality of arranged markings comprises an area or patch that also cannot be discerned by the unaided human eye. In some instances the patch is so small that it can't be located with the help of basic magnification. In further examples the patch is so small and occupies a surface area that is so small compared to the surface area of the article on which it is positioned that without prior knowledge of the general positioning of the patch on the article or without location landmarks on the article to assist in locating the patch, its discovery or location would be impossible or nearly impossible. Even if a person had knowledge that an article was marked with such a patch, its location would be impossible or nearly impossible for the person to locate with an unaided eye. In some instances a person would not even know that an article is marked with the code.

The marks created by a laser are so small that a special reader is required to read the code. Applicants envision continued development of a commercial Nanocode™ reader to use in conjunction with the present system. The Nanocode brand of reader is being designed to view and discern markings having a spot size or diameter on the order of nanometers (and/or the order of hundreds or thousands of nanometers). Creating such small size markings requires special laser equipment.

Heretofore such small size markings or apertures were not made for use in barcode identification technology, perhaps in part because existing systems were sufficient for the barcode purposes of the times, such small scale codes were simply not needed or recognized as needed, there was no effective or viable reader capable of reading such small scale markings to use as an efficient identifier, the technology was not developed to create such small markings that could also be accurately read, there was no or little appreciation of the need or capability to establish such small scale system, or for other reasons.

Applicants' development herein of nanotechnology barcode creation and reading systems presents opportunity to utilize the technology in numerous areas. One area is for use in anti-counterfeiting efforts. Other areas are for general identification or tracking of products.

In one aspect a small scale or nanometer sized code or barcode is marked onto a material with a laser of sufficient power to actually pierce very tiny holes or small marks not penetrating all of the way through the material which is to be protected from counterfeiting. The types of products that can be protected with this technology include, by way of example, currency such as currency or bank notes, coins, precious metals, jewelry, postage stamps, passports, ID badges, driver's licenses, legal documents, holograms, consumer products, etc. The types of materials that can be marked with a small scale or nanometer sized code or barcode include, for example, paper (inked or white), fabrics (cotton, linen, wool, silk etc.), metal (painted, coated or anodized), foil (all types), glass (coated or uncoated), ceramics, plastics (clear or opaque), crystals, gem stones, wood (coated or uncoated), stone or virtually any material. The code may be included on parts of systems or products for authentication and anti-counterfeiting purposes. In one aspect the applicants envision that a part internal to a watch, for instance, such as a cog or internal frame or underside of a base, for instance, may be marked with a code. Thus, when a watch is returned for repair or replacement, a warranty status may be determined. A manufacturer or distributor may determine that a returned item is authentic based on a reading of the hidden code. Because the code is not readily viewable, the code may also be "hidden" on an outside surface of the item. In a further example a fancy or expensive purse or handbag may be equipped with a clasp or zipper. The clasp or zipper may be an article that receives a code. The bag or purse may be authenticated by determining if a code is present or if a code matches a pre-set data. It may be appreciated that a data code may contain a great amount of information relating to an article to which the code is applied (i.e., where the article was manufactured, when, the specifics of the article, to whom the article is registered, make, model, sale history, maintenance history, warranty information, location tracking information, etc.).

In one aspect the invention pertains to a system of identification of an article where the system includes a machine-readable code on a surface of the article. The code conveys information regarding the article. The code comprises a plurality of laser-produced marks where a measure across a longest dimension of at least one of the marks ranges in length from about 0.1 microns to about 200 microns. Measurements at the low end of that range are theoretically achieved with use of an X-ray laser. A reader is configured to read the code. In further aspect the longest dimension of at least one of the marks ranges in length from about 6 microns (or about 6000 nanometers) to about 100 microns (or about 100,000 nanometers).

In a further aspect the invention includes a method of identifying an article having a machine-readable code on a surface of the article where the code conveys information relating to the article and contains a plurality of laser-produced marks. The method further includes positioning the article such that the code is in alignment with a reader having a microscope and configured to read image data corresponding to the code. The method further includes utilizing an image processor to adjust the image data and utilizing a barcode reader software to read the adjusted image data. In a further aspect the method includes identifying an article that is a flexible sheet of cellulose fibers (such as paper, such as currency notes or other valuable papers) where a measure across a longest dimension of at least one of a plurality of marks ranges in length from about microns to less than about 100 microns and further comprises utilizing oblique illumination lighting to read the image data. In further aspects the method includes utilizing an image processor to adjust the image data which includes adjusting a contrast feature of the image data to produce a contrasted image and to invert the contrasted image such that the contrasted image may be interpreted by barcode reader software.

The above summary of the present invention is not intended to describe each illustrated embodiment, aspect, or every object or implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 16 is an image of a modified image aspect in accordance with the present invention;

FIG. 17 is an image of a modified image aspect in accordance with the present invention;

Figure 1:
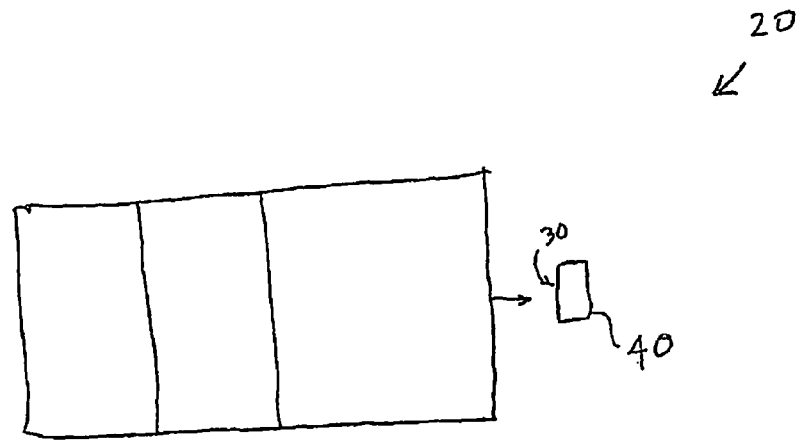
FIG. 1 is a schematic view of a system in accordance with an embodiment of the present invention.

While the invention is amenable to various modifications and alternative forms, specifics thereof have been shown by way of example in the drawings and will be described in detail. It should be understood, however, that the intention is not necessarily to limit the invention of the particular embodiments described.

DETAILED DESCRIPTION OF THE INVENTION

The following detailed description is not to be taken in a limiting sense, but is made merely for the purpose of illustrating the general principles of the invention, since the scope of the invention is best defined by the appended claims.

Figure 2:
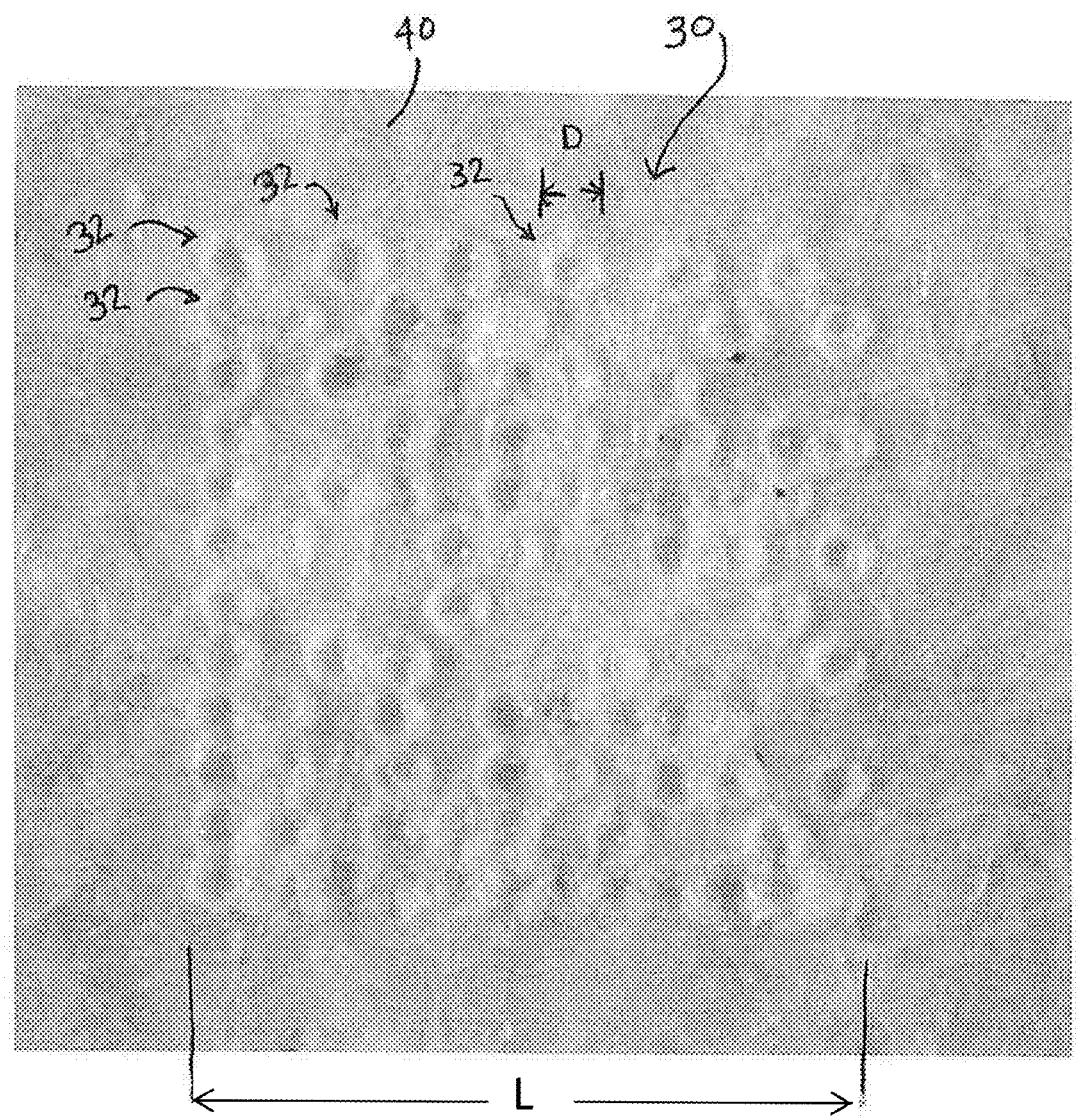
FIG. 2 is a plan view of a photomicrograph image in accordance with an aspect of the present invention.
Figure 5:
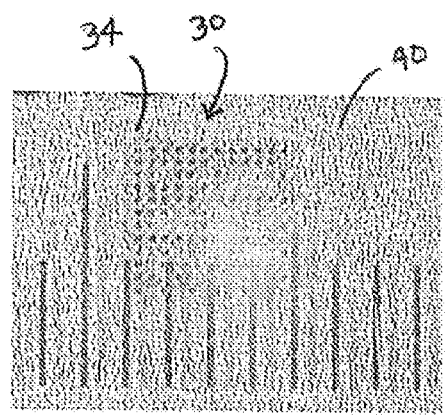
FIG. 5 is a greatly enlarged plan view of the aspect shown in FIG. 4.

According to one aspect of the invention generally shown in FIG. 1, an identification system 20 includes a code 30 located on an article 40. Code 30 is read by a reader 50. Code 30 is created by using a laser system 22. Code 30 is a small-sized code that includes a plurality of very tiny holes or very tiny markings that are placed on a surface of article 40. The markings (or holes) are arranged in a pattern that may be read by reader 50. The pattern may be in the form of a barcode. Barcodes may take on many forms. For example, a barcode may be any one or combination of a linear bar code, a stacked bar code, a 2D code, a uniform product code, a micro PDF code, a Smart code, an RSS limited code, and RSS limited composite code, an RSS stacked code, and RSS expanded code, an RSS expanded composite code, an ID-matrix code, or other style of code. In one example code 30 is a barcode of an ID-matrix code variety as shown in FIG. 2 or FIG. 5. In one example code 30 is so small that it cannot be seen by the unaided human eye. In further examples code 30 cannot be seen even with the aid of common magnification systems. Such small-scale code 30 allows for an article 40 to be secretly coded. Since code 30 may be so small, an article 40 may also be very small. Articles that heretofore have been unable to be marked with a barcode may now receive a code 30 for identification, authentication, anti-counterfeiting, or other purposes. Moreover, a code 30 may be placed on most any surface type.

Figure 3:
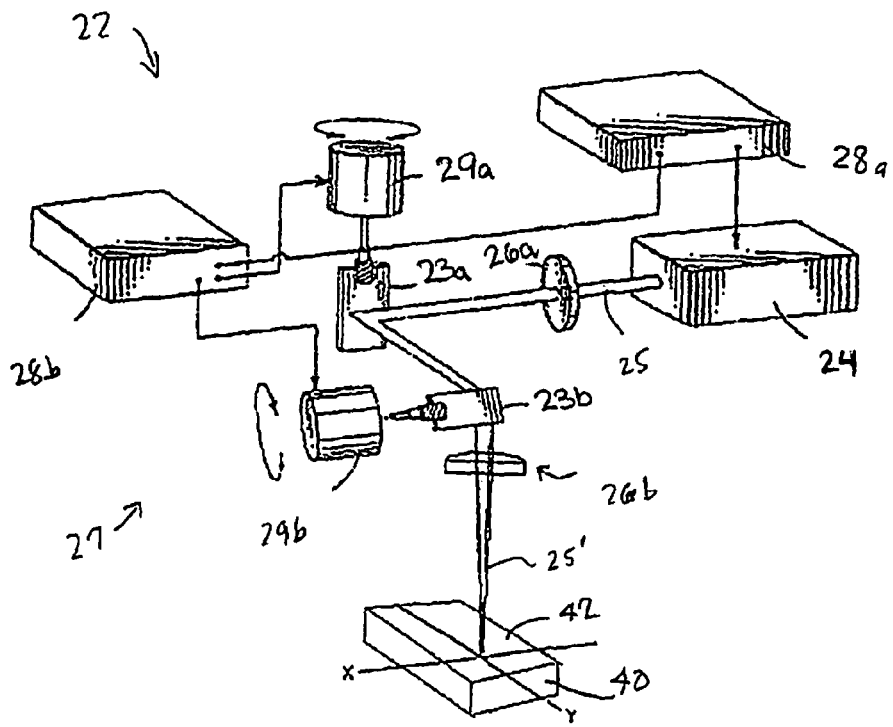
FIG. 3 is a schematic diagram of a further aspect of the present invention.

In one aspect as generally shown in FIG. 3, an example of a laser system 22 is used to create code 30 on a surface 42 of article 40. It may be appreciated that other varieties of laser systems may also be used. In the present example a laser 24 directs a laser beam 25 through beam forming optics 26a to shape the beam 25 before a computer controlled galvanometer scanning system 27 (CCGSS). In the present example the CCGSS system 27 includes a laser controller 28a, X-Galvanometer 29a, X-Mirror 23a, scanner controller 28b, Y-Galvanometer 29b, Y-mirror 23b, focusing optics 26b to produce a focused laser beam 25'. It may be appreciated that beam 25' may scan surface 42 to create a plurality of marks 32 or holes 34. In one aspect the marks may be generally circular. In one aspect the marks 32 may be apertures or holes 34 that run through article 40. A laser 24 having sufficient power to mark or drill a substrate or article 40 is directed through beam forming optics to prepare the beam to be scanned and focused onto a material or article 40 that is to receive the code 30.

The CCGSS system 27 with associated beam forming optics manipulates the beam 25 such that the beam 25' can or will be focused to a spot between 0.1 microns and 200 microns. The spot size or diameter D of a mark 32 or hole 34 depends on several factors, and may vary as noted. The type of laser and the wavelength associated with the laser, the type of beam forming optics, lenses, beam quality, laser power, duration of pulse, angle of incidence, scanner, scanner drivers, computer optimization, mirror type or mirror quality, software, and other elements will influence the spot size and quality of marks 32 or holes 34. In turn this will influence the ability to read or acceptably read the marks 32 or holes 34 and the associated code 30. The particular type of article 40 or surface 42 will also influence the ability to read the code 30.

In one example a mark 32 may have an associated diameter D (See FIG. 2) of approximately 0.0028 inches. Diameter D represents a measure across a longest dimension of mark 32. In another example a hole 34 (as in FIG. 5) may have an associated diameter of approximately 17 microns or about 0.0007 inches. The associated actual code 30 size as in FIG. 5 is 0.023 inches or about 584 microns (micrometers) (or with undertaking a closer pack the code 30, measures about 0.010 inches or 254 microns). Use of a beam having a shorter wavelength may produce a hole having smaller diameter. Increasing the diameter of in input beam 25 will also result in a smaller spot size when the beam is passed through the optics.

In one aspect laser 24 may include a CO2 laser (~10.6 microns) or a thulium doped fiber laser (1-100 watt). A beam 25 is directed through beam forming optics 26a and CCGSS 27 to shape the beam. The CCGSS 27 directs the shaped laser beam 25' to predetermined coordinates on an article 40 that comprises the code 30 such as a barcode. In other aspect the code 30 may also be a human readable mark. The beam 25' may be focused with a pre-scan objective, a dynamic focusing 3-axis scanner, or in a further aspect, a flat field scan lens. A combination of focusing optics 26b may also be used.

Other aspects utilize various laser types such as but not limited to: fundamental operation, $2^{nd}$, $3^{rd}$ & $4^{th}$ harmonics of Nd:YAG and Ytterbium Fiber lasers. HeCd, Argon, Krypton, Alexandrite, Excimer and many other laser types may also be considered for this application.

The requirements of the laser 24, scanning system and optics are configured such that the laser system 22 is capable of making a mark 32 or drilling a small hole 34 on the substrate or surface 42 of an article 40 with sufficient contrast to be read with a code reader. Applicants have developed a barcode reader for this purpose. In one example the marks 32 or holes 34 are sufficiently small enough to not be obvious to the human eye.

Sufficient power for a laser will be between 0.1 & 100 watts. The wavelength of the laser can typically be anywhere ranging from about 0.1 nanometers to 10,600 nanometers. In some particular laser examples the wavelength is between about 266 nanometers and 10,600 nanometers.

Focusing optics such as at optics 26b may include a focusing lens. Such focusing lens may include a flat field scan lens (Fm) or other lens, including a telecentric Fφ lens.

A small focused spot size can be achieved by increasing the diameter of the laser beam 25 with respect to the focal length of the Fφ (flat field scan lens) (i.e., focusing optic 26b) or the pre-scan objective given by the following equation:

$$SS = 1.27 \lambda F/D$$

And $\Delta F = 1.27 \lambda (F/D)^2$

Where: SS=focused spot size $\Delta F$=depth of field at the $1/e^2$ (13.5%) spatial beam divergence on each side of optimum focus And: 1.27 is a constant that is compatible with typical imperfections in a laser beam coupled with normal aberrations in the focusing lens.

$\lambda$=the wavelength of laser emission

F=the focal length of the Fφ lens or the effective focal length of a pre scan objective lens system D=the diameter of the laser beam at the focusing lens.

The following is a table of calculations for spot size, depth of field and typical ID-matrix code sizes associated with various types of lasers which may be utilized in laser system 22.

Calculations for various candidate laser systems such as CO2, IPG

Fiber (2 μm & 1 μm) and 3rd harmonic Nd:YAG (354 nm) and others:

TABLE 1

| Laser Type | Wavelength meters | Fφ | Beam Diameter Mirror Aperture |
|---|---|---|---|
| CO2 Laser | 1.06E−05 | 70 mm | 15 mm |
| Fiber 1μ | 1.06E−06 | 160 mm | 15 mm |
| Fiber 2μ | 2.00E−06 | 100 mm | 15 mm |
| OPO DPSS | 3.00E−06 | 160 mm | 15 mm |
| 2nd harmonic | 5.32E−07 | 160 mm | 10 mm |
| 3rd harmonic | 3.54E−07 | 160 mm | 10 mm |
| 4th harmonic | 2.66E−07 | 200 mm | 10 mm |

| Laser | Spot Size meters | Spot Size inches | Δ Field meters | Δ Field inches | Code Size inches |
|---|---|---|---|---|---|
| CO2 Laser | 6.2823E−05 | 0.002473 | 2.93E−04 | 0.011542 | 0.05936 |
| Fiber 1μ | 1.4414E−05 | 0.000567 | 1.54E−04 | 0.006053 | 0.01362 |
| Fiber 2μ | 1.6933E−05 | 0.000667 | 0.000113 | 0.004444 | 0.01600 |
| OPO DPSS | 2.5400E−05 | 0.001000 | 0.000169 | 0.006667 | 0.02400 |
| 2nd harmonic | 1.0810E−05 | 0.000426 | 0.000173 | 0.006810 | 0.01021 |
| 3rd harmonic | 7.1933E−06 | 0.000283 | 1.15E−04 | 0.004531 | 0.00680 |
| 4th harmonic | 6.7564E−06 | 0.000266 | 8.65E−05 | 0.003405 | 0.00638 |

Figure 6:
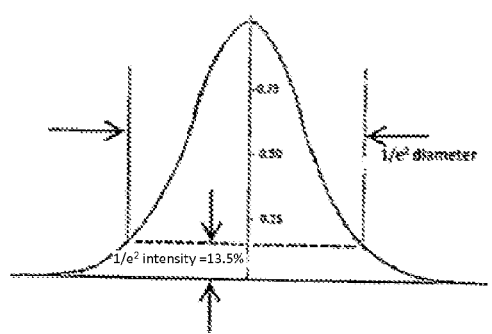
FIG. 6 is a graph depicting a Gaussian energy distribution of a laser beam.

It may be appreciated that the calculations in Table 1 reflect the spot size (i.e., diameter D of marks 32 or holes 34) to be at the $1/e^2$ energy distribution power points. The actual size of the mark or hole is a function of laser power (LP), pulse width (PW) and scan velocity (SV). Smaller features can be realized by adjusting LP, PW & SV such that the material ablation threshold is adjusted to be about 0.75 (See FIG. 6) to see that features smaller than $1/e^2$ can be achieved with one who is skilled in the art. The Code Size measured in inches may also be reduced (or enlarged) by changing the number of marks 32 or holes 34. For instance, the code size shown in Table 1 represent use of a spot size calculation of 24 (i.e., 12 marks separated by 12 spaces). The code size may be reduced by use of a spot size calculation of 18 or by positioning the marks or holes closer together. For instance, the codes size using the CO2 laser may be about 0.04452 thousandths of an inch when using a spot size calculation of 18.

Figure 13:
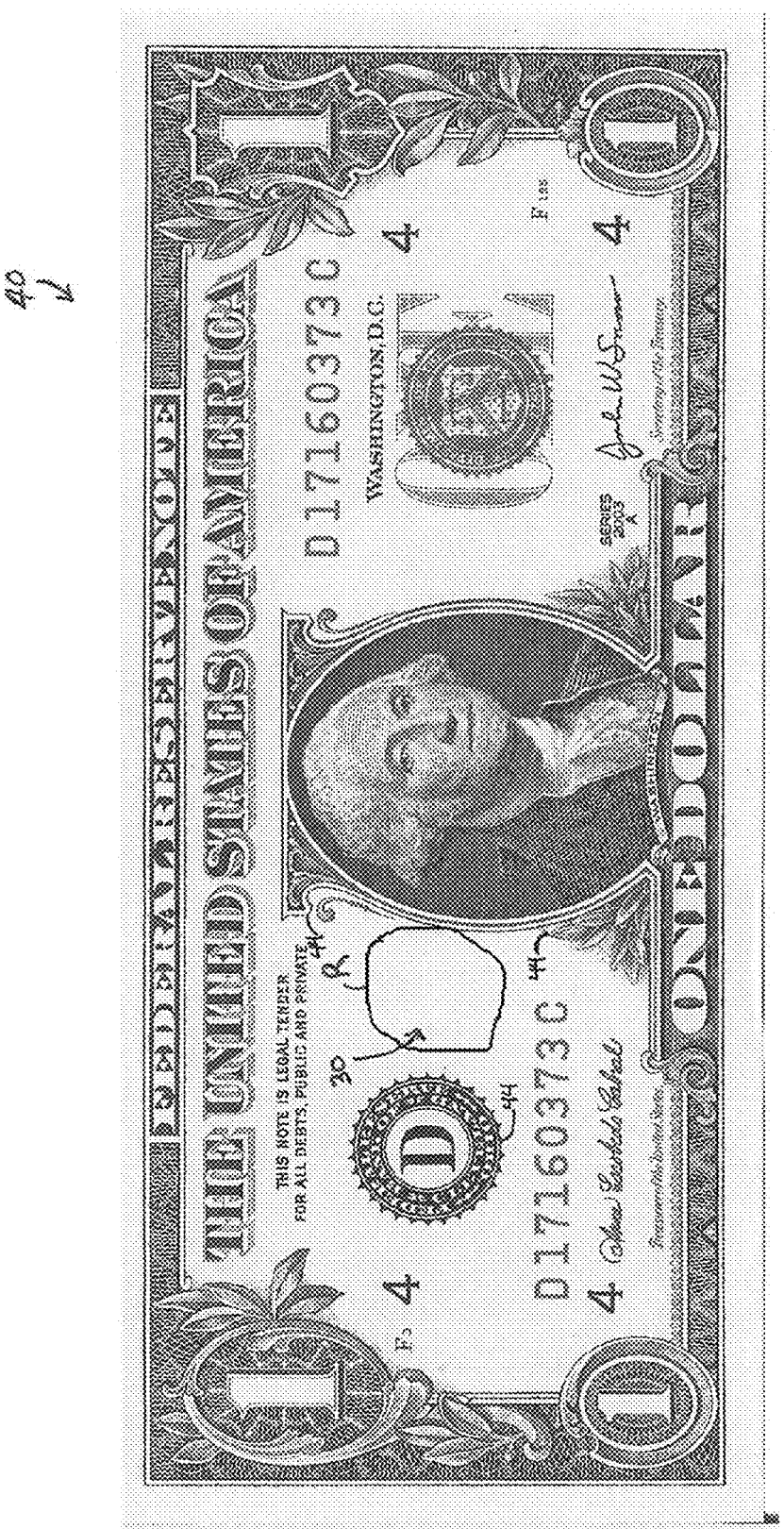
FIG. 13 is a plan view of an article in accordance with the present invention.
Figure 14:
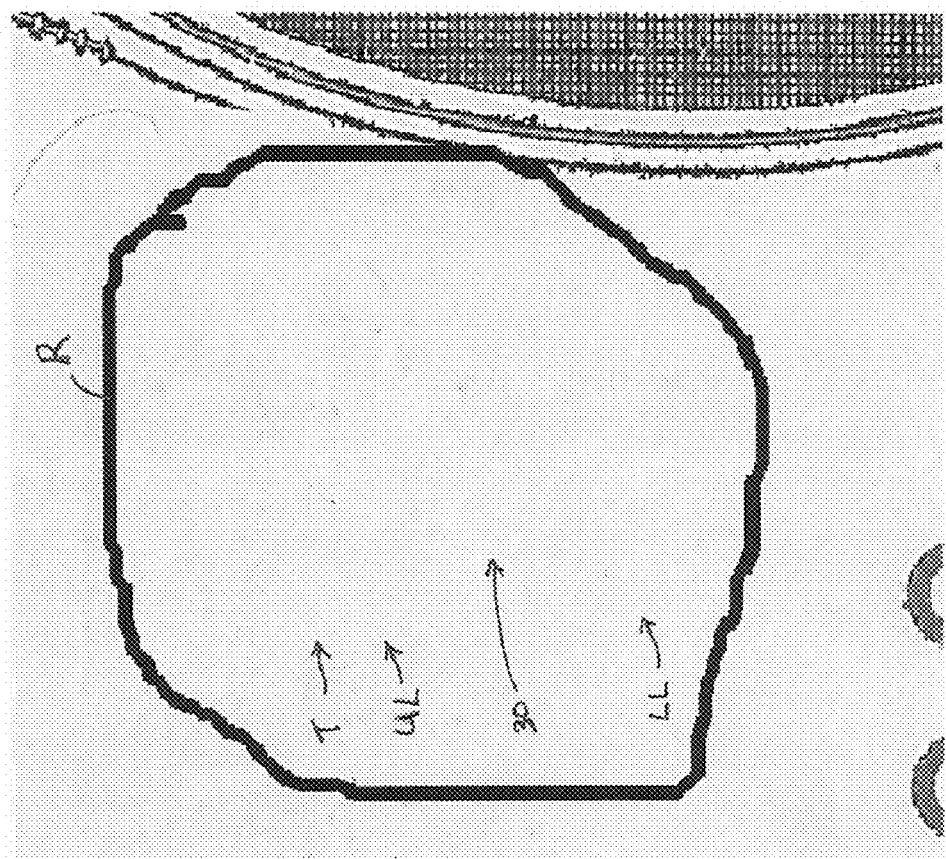
FIG. 14 is an greatly enlarged image of the article of FIG. 13 taken along border R as shown in FIG. 13.

Referring to FIG. 2 an example is shown of a code 30 positioned on the surface 42 of an article 40. In this example the article is a flexible sheet of cellulose fibers, i.e., paper. Particularly, the article is a currency bill (See FIGS. 13 and 14). Code 30 is made of a plurality of marks 32. In this aspect the marks 32 do not run through the paper. The actual measured dimensions of the spot size or mark 32 size in this example is 0.0028 inches. The actual length L of code 30 is 0.037 inches. As shown in FIG. 13 an article 40 such as a dollar bill (or other currency note or other paper item) may include code 30. FIG. 14 shows a magnified image of the designated region R. A text impression "T" is faintly visible within region R which text impression reads "sample 385" and represents an impression that remains from securing article 40 within a clamp used to hold article 40. The sample 385 was numbered to keep track of sample articles. Below impression T is a faint box having an upper line UL and a lower line LL. Positioned inside this box is code 30 (which cannot be seen even with this magnification) which is located in the center of the box. The code 30 produced in FIG. 2 is identical to the code that was produced on Sample 385 of FIG. 13 and FIG. 14. Code 30 in FIG. 13 and FIG. 14 cannot be seen with the naked eye or with optical magnification. Code 30 in FIG. 2 was created by using a CO2 laser as noted above. The image shown in FIG. 2 was produced using an oblique lighting technique. As will be described further below, other lighting techniques were insufficient for producing an acceptable image to properly show code 30 for reading or processing.

Figure 4:
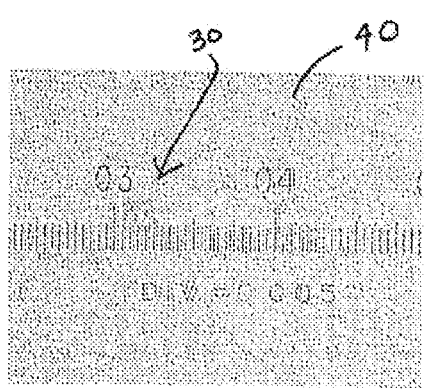
FIG. 4 is a photomicrograph image in accordance with an aspect of the present invention.

Referring to FIG. 4, shown is a photomicrograph of article 40, which is a metal foil (aluminum in this instance) bearing a code 30 which was produced with Ytterbium Fiber Laser (1 micron wavelength) utilizing the laser system of the present invention. A reticle was placed over the photomicrograph to illustrate the scale of the features. The reticle is lined where each marking represents 0.005 inches (i.e., 5 thousandths). The photomicrograph is magnified to approximately 10× magnification. It may be appreciated that even at 10× magnification the holes 34 which make up code 30 may not be identified.

FIG. 5 shows the micrograph of FIG. 4 at approximately 50× magnification. The holes 34 which comprise code 30 are individually visible. It may be appreciated that a diameter of hole 34 is approximately 0.001 inches. It may also be appreciated that the length of one side of the ID Matrix code is about 20 thousandths of an inch (spanning across approximately 4 of the reticule hash markings). The code 30 size may be smaller where fewer holes 34 are used or where the holes 34 are spaced closer together.

Figure 7:
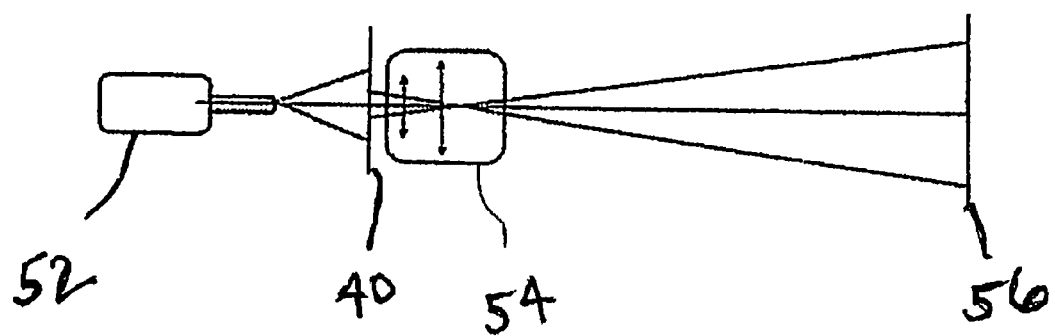
FIG. 7 is a schematic diagram in accordance with an aspect of the present invention.
Figure 8:
FIG. 8 is photographic perspective view in accordance with an aspect of the present invention.
Figure 9:
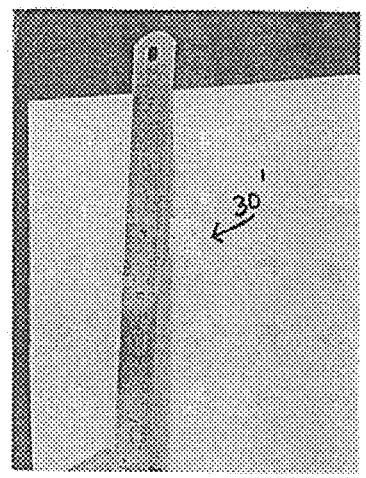
FIG. 9 is an enlarged view of the aspect shown in FIG. 8.
Figure 10:
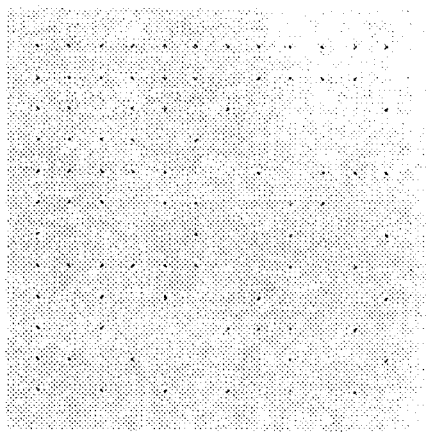
FIG. 10 is a plan view of a code in accordance with an aspect of the present invention.

Referring to FIG. 7 a schematic of a breadboard is depicted. The breadboard was used to demonstrate that a code 30 can be magnified to be detected by a CCD array (viewing screen 56 or CCD array or camera having the same). Particularly, a light source 52 was used to beam light toward article 40 of FIG. 5. A portion of the light passed through the holes 34 of the article 40 and into or through a microscope 54 which in turn magnified and projected the hole images onto a viewing screen or CCD array. FIG. 8 is a photographic image showing the setup generally of FIG. 7. FIG. 9 is a photographic image showing a close-up view of the projected code, i.e., a projected code image 30. A reticle is provide to view a scale of the magnified image. FIG. 10 is a representative image of an ID-matrix code that has been used to create code 30 as an example. The ID-matrix code in FIG. 10 corresponds with the numeric 1234567890. This is a 12×12 matrix of dots.

Figure 11:
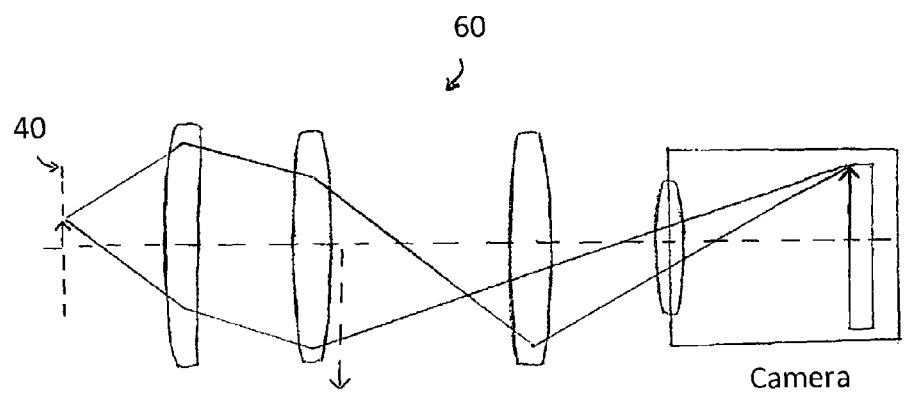
FIG. 11 is a diagram of a microscope aspect for use in accordance with the present invention.

Referring to FIG. 11, a schematic of a digital microscope 60 is presented in association with an article 40. Microscope 60 is shown as an example. It may be appreciated that the particular lenses and lengths may vary depending on the type of microscope. The present system is not limited to use of a microscope of the variety shown in FIG. 11. Microscope 60 may be used in conjunction with a camera, CCD array, light source and other components. Typically a digital microscope will include a camera which includes a CCD array. A variety of lenses may be included as is understood by one skilled in the art. Microscope 60 may be configured to display an image on a computer screen as an example. Microscope 60 may also produce or capture an image which is passed to other equipment, including to image processing equipment and software and further to barcode reader software.

Figure 12:
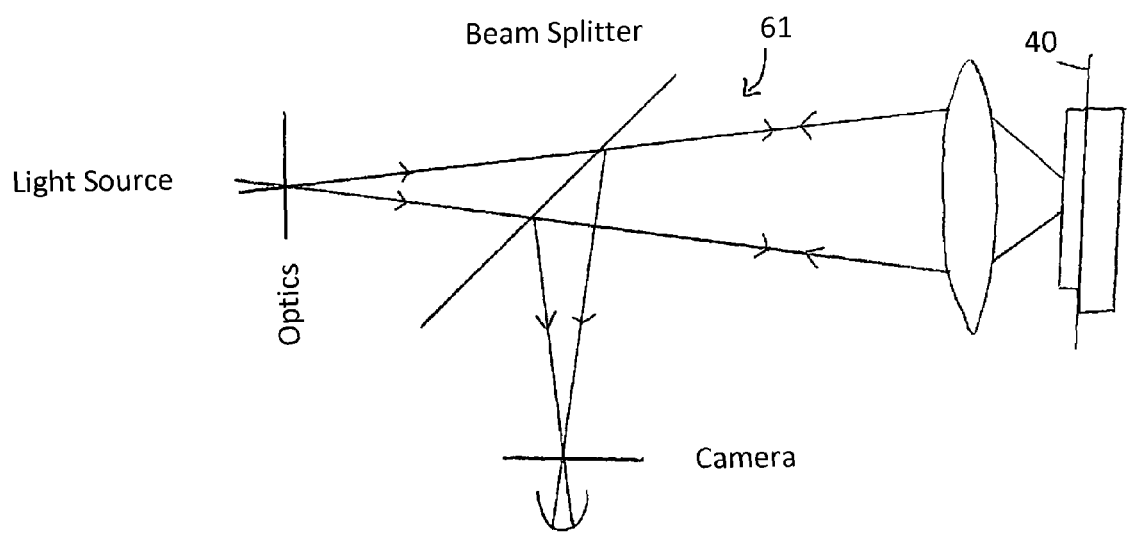
FIG. 12 is a diagram of a microscope aspect for use in accordance with the present invention.

Referring to FIG. 12, a confocal microscope 61 configuration is shown. Such microscope 61 may be utilized in reading code 30. Other microscope varieties might also be used.

Figure 15:
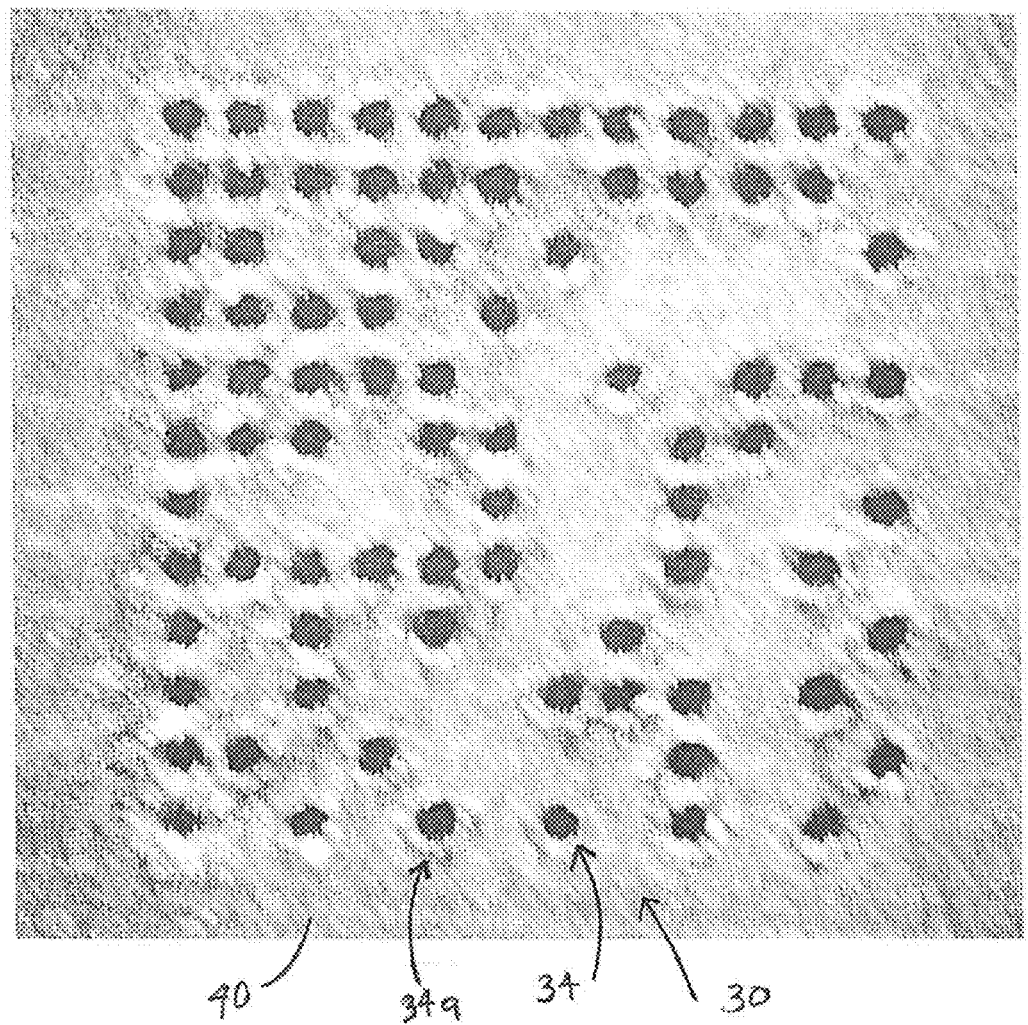
FIG. 15 is photomicrograph in accordance with an aspect of the present invention.

FIG. 15 shows an article 40 (in this case an aluminum metal) having a code 30 made of a plurality of holes 34. The image shown in FIG. 15 was obtained by using a digital microscope of the variety shown in FIG. 11. It may be appreciated that a variety of metal articles may be treated with a code 30. Instead of or in addition to aluminum, article 40 may include gold, silver, stainless steel, copper caste metal plate, diamond, gems, or other hard (or softer) surface. Instead of using holes 34 which penetrate through article 40, marks 32 may be used to form code 30.

Once code 30 representing a barcode has been imparted onto article 40, the article may be slipped into a barcode reader 50 or positioned in alignment with reader 50. In one example reader 50 may transmit light through the drilled holes 34 or marks 32 (reflected light) and communicate the information written into code 30 to an optical barcode reader. The reader may be calibrated to read the data with a very favorable signal to noise ratio.

A reader 50 may include a CCD array (or other barcode reading sensor) and a light source. A microscope 60 may also be included as part of reader 50 or may be a separate component.

In one aspect reader 50 may include a slot which receives an article 40 such as a currency or bank note 40 as shown in FIG. 13. In other aspects the article 40 is aligned so that reader 50 and microscope 60 may read code 30 without having to insert article 40 into a reader.

Figure 18:
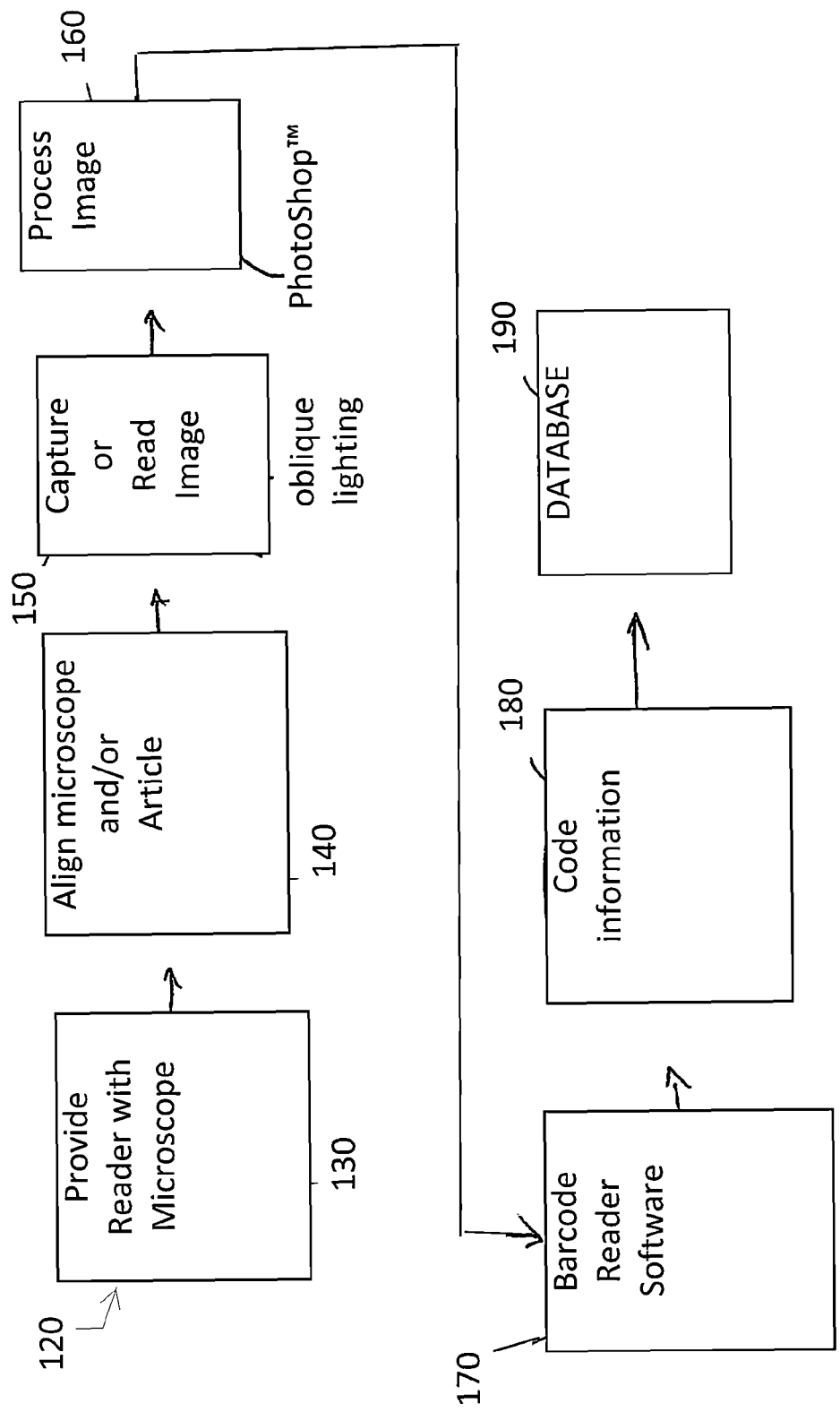
FIG. 18 is a flow diagram in accordance with a further aspect of the present invention.

In one aspect a method 120 of identifying an article 40 is presented. With reference to FIG. 18, method 120 includes a step of providing a reader 130 to read an article 40. Article 40 is provided with a code 30 as described. Step 140 includes aligning a microscope 60 with article 40. This may be accomplished by adjusting the position of either the microscope 60, the article 40, or both. In one aspect a visioning system will allow for alignment of article 40 to be read by reader 50. Article 40 may include, for instance, landmarks 44 or fiducials (See FIG. 13) which allow a vision system to find the landmarks 44 and adjust a reader 50 to a desired area of the article 40. In one aspect the landmarks 44 allow a vision system to triangulate in order to position a reader at a preselected coordinate where a code 30 is known to be located. Without such landmarking system, it may be difficult to locate the general area of code 30 which may delay or frustrate the process. Once the code has been located, a capture or read step 150 is utilized. At step 150 the reader 50 will read or capture an image of code 30 as may be appreciated.

Figure 19:
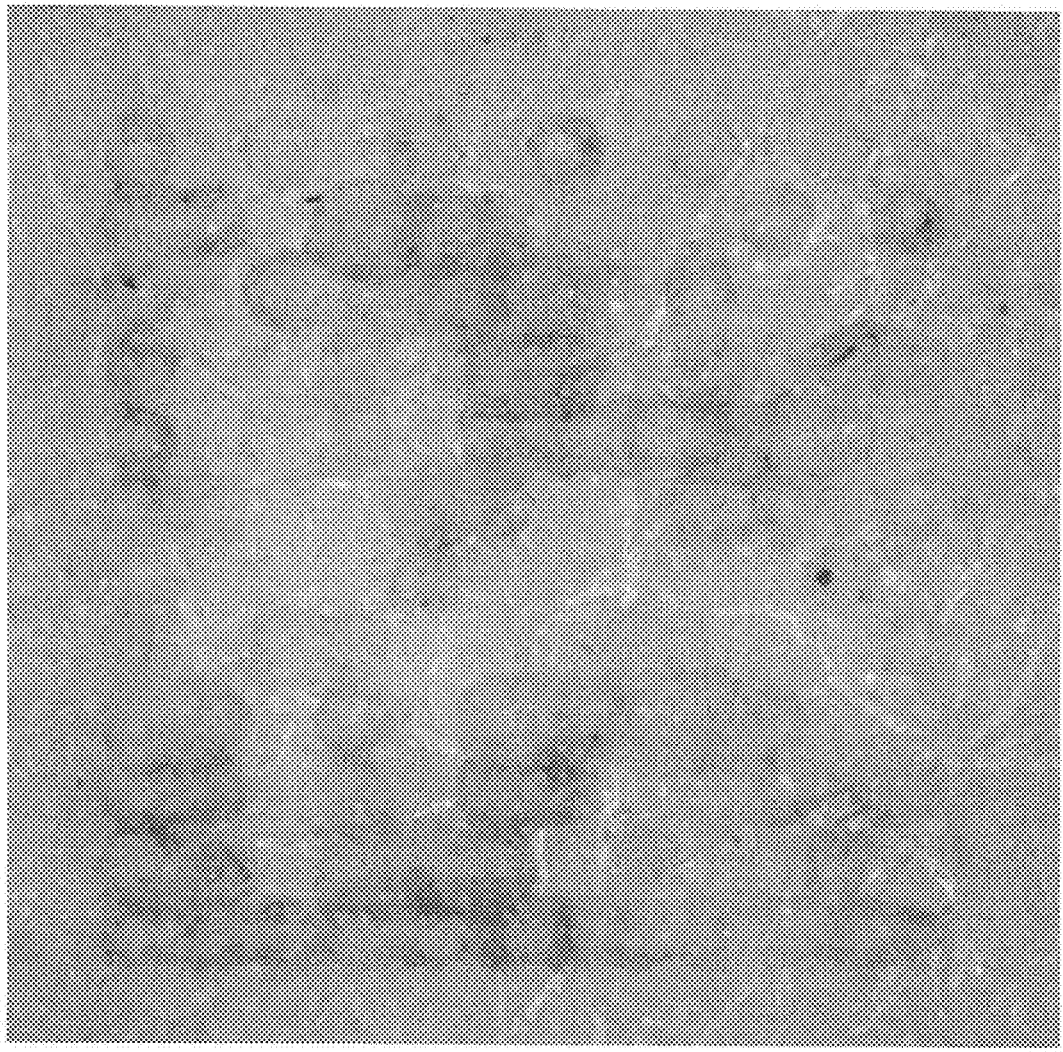
FIG. 19 is a photomicrograph of a paper under top lighting.
Figure 20:
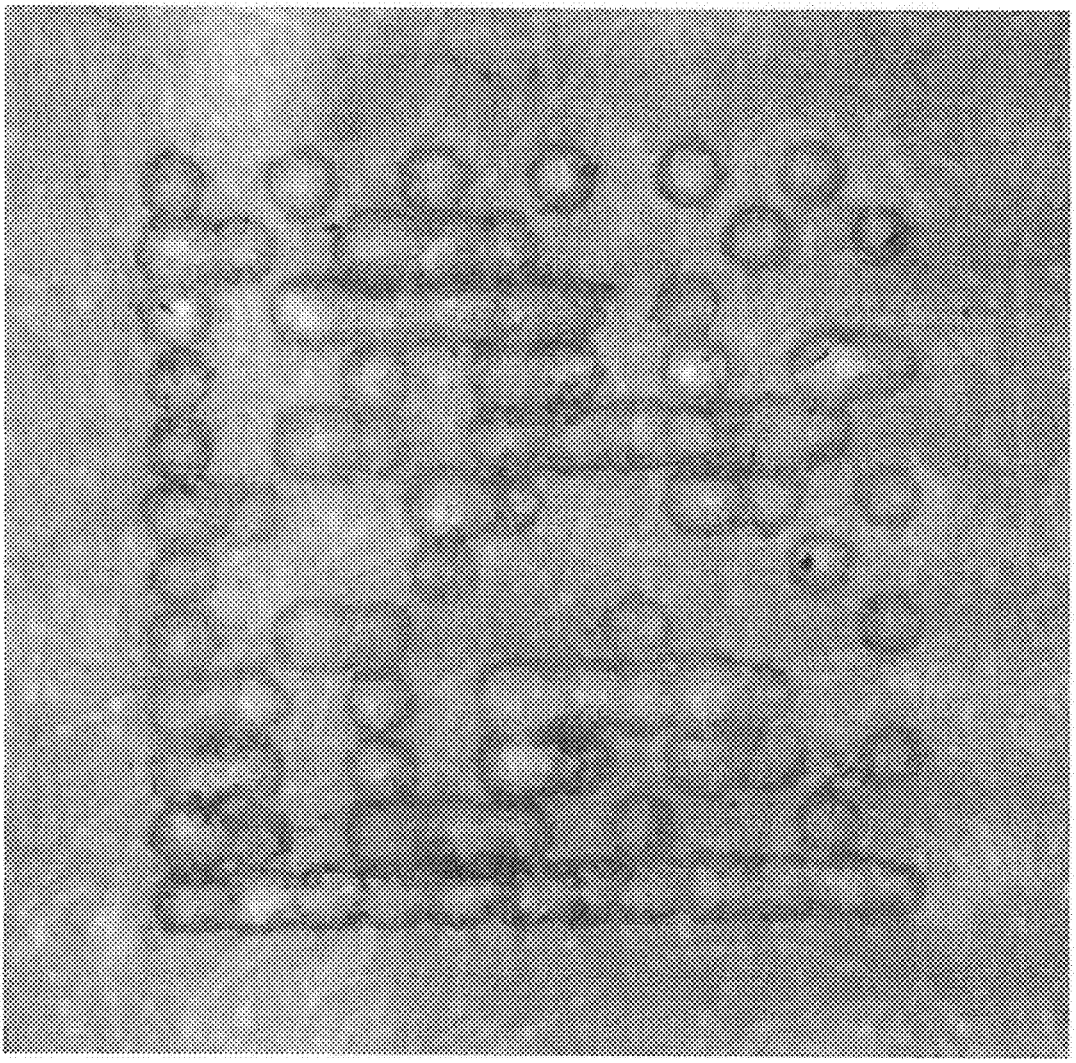
FIG. 20 is a photomicrograph of a paper under backlighting.

In order to assist in the reading or capture at step 150, code 30 may require special illumination. In one instance code 30 will be illuminated by use of oblique illumination lighting. Oblique illumination lighting is understood by those skilled in the art. Oblique illumination lighting was used to form the image shown in FIG. 2. Other types of lighting such as top lighting (See FIG. 19) and backlighting (See FIG. 20) may be attempted but thus far have been ineffective at producing an image having sufficient definition or contrast in the example using paper. Use of top lighting and backlighting on paper (FIG. 19 and FIG. 20) were unable to produce a sufficient image for reading as was achieved with oblique lighting as shown in FIG. 2. In one instance a ring light is used to create appropriate oblique lighting. A ring light comprising LED light components may be utilized to create the oblique (or off-axis, side or angled lighting) lighting. In other aspects where paper is not the article bearing the code 30, top lighting and backlighting techniques may be sufficient for reading code 30.

When code 30 is sufficiently presented for reading by reader 30, the image that is captured or read at step 150 may be adjusted by an image processor, step 160. An image processor, such as Adobe PhotoShop™ or other image processing software may be utilized to adjust the captured or read image to create an adjusted image or data representing the adjusted image. In one instance the image processor may will adjust the captured or read image of code 30 by altering the contrast of the original image to produce a contrasted image. A jpeg format of an image is one example that may be created. Other formats may be utilized. One example of a contrasted image is shown in FIG. 16. Particularly, the image shown in FIG. 15, when adjusted at step 160 may result in a contrasted image which improves the signal/noise aspects of the image and code. As shown in FIG. 16, elements of the image include clearly defined black and/or white aspects. The image shown in FIG. 16 is a contrast of the image of FIG. 15. Thereafter image processor may be utilized to invert the contrasted image to make the contrasted image sufficient for interpretation by barcode reader software. The image shown in FIG. 17 is an inversion of the image shown in FIG. 16. After the contrasted image is prepared at step 160 the image (or data representing the image) is passed to barcode reader software at step 170. Such image manipulation may be automatically programmed into the processing software to undertake a set series of manipulative steps. The particular steps or particular sequence of steps may be altered to enhance the resulting image for reading. Such image processing may be utilized with respect to images relating to code 30 presented on FIG. 2, as well as for processing images captured on other types of articles 40. Garden-variety or standard barcode reader software may be utilized to interpret the adjusted image (i.e., the image shown in FIG. 17 or data representing such image). The barcode reader software interprets the adjusted image (i.e., such a interpreting a jpeg or other formatted image representing a code or barcode) which is represented as a coded information (see Step 180) which may be passed to a database (190) or other component for use or storage. Such coded information may be used to authenticate the article 40 by comparing the coded information represented by code 30 with information previously stored (as an example), on a database. An authentication of the article 40 may occur. Counterfeiting may be detected where the code 30 and related coded information is lacking or where code 30 or its corresponding coded information does not match a data record. It may be appreciated that step 160 allows for enhancement of image data represented by code 30 to allow for use of very small marks 32 or holes 36 that would otherwise be impossible or extremely difficult to distinguish or recognize and read as a barcode. The methods and techniques greatly enhance the readability of the marks 32, holes 36 or codes 30. Image processing software may be configured to automatically adjust images and pass the adjusted image or data to barcode reader software.

It may be appreciated that Fourier analysis and fast Fourier analysis may further filter features that are not at a specific spatial frequency of code 30 making a virtually invisible code stand out with high contrast in the scanned image. Such Fourier analysis may occur before, during or after image processing.

It may also be appreciated that code 30 may also be disguised by natural physical features of the article 40 or material being marked, or code 30 may be hidden in a graphic printed on article 40.

It may be appreciated that different lasers emitting beams having different wavelengths and of differing beam quality may be utilized. In some instances one type of laser will work better than another type of laser. For instance, in producing a code 30 on paper, a Fiber 1 micron wavelength laser may be sufficient for producing marks 32 or holes 34 in a black sheet of paper or similar article 40. Yet a laser beam produced by such laser would likely be insufficient for producing marks 32 on a white colored surface or paper. The beam in such case reflects from the surface and does not produce a mark 32 or a sufficient mark 32. A 1 micron laser beam acts similar to visible light when directed at paper which will not absorb the light. A photo resist or IR absorbing dye is normally required with a 1 micron laser when dealing with paper or products similar to pulp. A laser having 2 micron wavelength, however, will have sufficient characteristic to penetrate a white surface in order to provide a mark 32. A 2 micron laser, for example, also has a much smaller spot size than a CO2 laser, and therefore may be used in different applications that are not possible with the CO2 laser. As the spot size is reduced, opportunity exists for greater options in making codes 30. Further, a CO2 and a 2 micron laser may be used to place marks 32 on organic material where a 1 micron laser has limited application. A 2 micron laser may be configured to provide a beam quality similar to a beam from a CO2 laser yet is able to have greater control over spot size and especially a reduced spot size.

In a further aspect, a pulsed Excimer laser (UV) imaged through a mask may be utilized to create codes 30. Further, a laser producing a very short wavelength beam, such as from a free electron laser, may emit at 0.1 nanometers which may enable much smaller codes 30 that what has been addressed above. Use of such short wavelength lasers together with the remaining aspects noted above is contemplated.

Figure 21:
FIG. 21 is a plan view of a paper article in accordance with a further aspect of the present invention.
Figure 22:
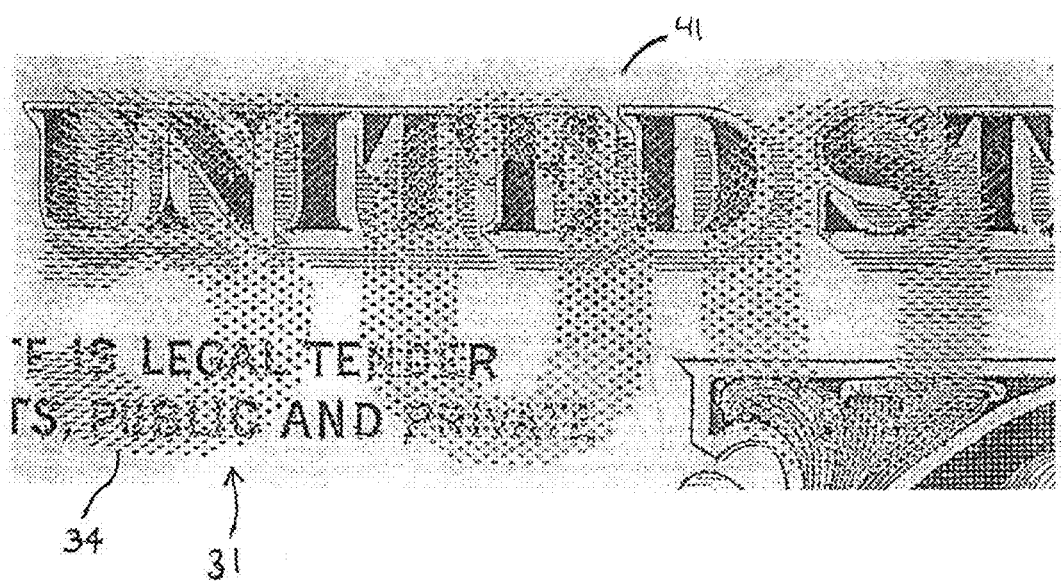
FIG. 22 is a close-up view of the article of FIG. 21.

In a further aspect, an article 41 may include a laser-produced code 31 that is visible to the human eye. Article 41 may be prepared using the aspects described above. In one aspect, code 31 may contain holes 34 that may be visible to the human eye. As shown in FIG. 21 and FIG. 22, code 31 is represented by the text image "500". An array of such holes 34 may be included on article 41 to produce a visible code 31 that is somewhat concealed from easy view. Yet when article 41 is held to a light source, such as held up to a light, the light beams will pass through holes 34, thus illuminating code 31. In such manner, for instance, a bank teller may hold a currency note up to the light to determine the authenticity of the note. Holes 34 may be positioned very close together in some instances, or holes 34 may be reduced in size, such that code 31 become increasingly difficult to ascertain unless or until article 41 is held up to a light for viewing of code 31. Code 31 may be any desired alpha-numeric or other symbol.

In one aspect, the code 31 may be of a size as shown which is about 1.5 to 2 inches. It may be appreciated that much smaller code 31 sizes may be used. As the code size is lessened, it may be more easily concealed on article 41. Yet when article 41 is held to a light source, such as a fluorescent or other light, the code 31 will allow light to pass. This produces a dramatic effect and appears as though article 41 includes a light source. It may be appreciated that human readable code such as code 31 may be used with article 41 in such examples. It may also be appreciated that the hole size may be lessened (by varying the laser or other features used to create holes 34)

to make viewing of code 31 less likely (or only clearly or readily viewable when article 41 is held to a light).

It should be understood, of course, that the foregoing relates to exemplary aspects and embodiments of the invention and that modifications may be made without departing from the spirit and scope of the invention as set forth in the following claims.

What is claimed is:

1. A system of identification of an article having cellulose fibers, said system comprising:
   a machine-readable code having laser-produced marks on a surface of the article having cellulose fibers, said code conveying information relating to the article, said code comprising a plurality of laser-produced marks where a measure across a longest dimension of at least one of the marks ranges in length from about 0.1 microns to about 40 microns; and
   a reader adapted to read said code, said reader configured to utilize oblique illumination lighting to read said code.

2. The system of claim 1 where said reader includes a digital microscope, a CCD array and a light source.

3. A system of identification of an article, said system comprising:
   a machine-readable code on a surface of the article, said code conveying information relating to the article, said code comprising a plurality of laser-produced marks where a measure across a longest dimension of at least one of the marks ranges in length from about 0.1 microns to about 200 microns; and
   a reader adapted to read said code and where said system is configured to mark and identify each of the following articles: a paper (inked or white), a flexible sheet of cellulose fibers, a metal article (metal, painted, coated, anodized, stainless), a fabric (cotton, linen, wool, silk), a foil, glass (coated or uncoated), a ceramic, a crystal, a gem stone, wood (treated, untreated, coated, uncoated), a stone.

4. The system of claim 3 where the article is a flexible sheet of cellulose fibers and where a measure across a longest dimension of at least one of the laser-produced marks ranges in length from about 6 microns to less than 200 microns.

5. The system of claim 4 where said reader includes a digital microscope and a CCD array and utilizes oblique lighting illumination of the sheet of cellulose fibers.

6. The system of claim 5 where a ring light comprising LED components is utilized to create the oblique lighting illumination.

7. A system of identification of an article, said system comprising:
   a machine-readable code on a surface of the article, said code conveying information relating to the article, said code comprising a plurality of laser-produced marks where a measure across a longest dimension of at least one of the marks ranges in length from about 5 microns to about less than 100 microns; and
   a reader adapted to read said code and where said article is a flexible sheet of cellulose fibers and where said reader includes a digital microscope and a CCD array and utilizes oblique lighting illumination of the sheet of cellulose fibers, and where a light comprising LED components is utilized to create the oblique lighting illumination and further comprising aligning means for automatically aligning said article and/or said reader such that said microscope may read said code.

8. A system of identification of an article, said system comprising:
   a machine-readable code on a surface of the article, said code conveying information relating to the article, said code comprising a plurality of laser-produced marks where a measure across a longest dimension of at least one of the marks ranges in length from about 5 microns to about less than 100 microns; and
   a reader adapted to read said code and where said article is a flexible sheet of cellulose fibers and where said reader includes a digital microscope and a CCD array and utilizes oblique lighting illumination of the sheet of cellulose fibers, and where a light comprising LED components is utilized to create the oblique lighting illumination and further comprising an image processor configured to adjust an image of said code read by said reader to produce an adjusted image, said adjusted image configured to be utilized by a barcode reader software.

9. The system of claim 8 where said image processor is configured to adjust a contrast feature of the image to obtain a contrasted image and to invert the contrasted image.

10. An article comprising:
    a surface upon which a machine-readable code is positioned, said code conveying information relating to the article, said code comprising a plurality of laser-produced marks where a measure across a longest dimension of at least one of the marks ranges in length from about 5 microns to no more than about 100 microns, said code configured to be read by a reader, said article is a flexible sheet of cellulose fibers and said code is configured to be unreadable by a digital microscope for use in conjunction with barcode reader software unless oblique illumination lighting is utilized.

11. The article of claim 10 where said article contains at least two reference markers capable of being utilized by a reader to position a digital microscope in alignment with said code.

12. A method of identifying an article having a machine-readable code on a surface of the article, the article being a flexible sheet of cellulose fibers and the code conveying information relating to the article and including a plurality of laser-produced marks where a measure across a longest dimension of at least one of the marks ranges in length from about 0.1 microns to about 200 microns, said method comprising:
    positioning the flexible sheet of cellulose fibers such that the code is in alignment with a reader having a microscope and configured to read image data corresponding to the code;
    utilizing an image processor to adjust the image data; and
    utilizing a barcode reader software to read the adjusted image data.

13. The method of claim 12 where the measure across a longest dimension of the at least one of the marks ranges in length from about 5 microns to less than about 100 microns, the method further comprising:
    utilizing oblique illumination lighting to read the image data;
    said utilizing an image processor to adjust the image data includes adjusting a contrast feature of the image data to produce a contrasted image and to invert the contrasted image such that the contrasted image may be interpreted by the barcode reader software.

14. A method of universally marking and tracking a variety of different articles made of different materials utilizing a code having individual marks which are individually indiscernible to an unaided human eye and applied to non-removable surfaces of the articles, said method comprising:
    applying a machine-readable code having marks individually indiscernible to the unaided human eye, on a non-removable surface of an article made of a material, said code conveying information relating to the article, said code comprising a plurality of laser-produced marks where a measure across a longest dimension of at least one of the marks ranges in length from about 0.1 microns to about 40 microns, said applying step configured to apply a code to a paper material; and reading the code utilizing a reader having a digital microscope and an image processor configured to adjust an image of the code.

15. The method of claim 14 where said reading step includes utilizing a CCD array, the adjusted image configured to be utilized by a barcode reader software.

16. A method of marking a flexible sheet of cellulose fibers, said method comprising:

utilizing a laser to produce marks on a surface of the sheet, the marks corresponding to a machine-readable code conveying information relating to the sheet and configured to be read by a reader configured to utilize oblique illumination lighting to read the code, a measure across a longest dimension of at least one of the marks ranges in length from about 0.1 microns to about 200 microns.

* * * * *